Nov. 23, 1943.  C. A. GUSTAFSON  2,334,922
VEHICLE SEAT
Filed Feb. 4, 1941   3 Sheets-Sheet 1

INVENTOR
Carl A. Gustafson
BY
ATTORNEY

Nov. 23, 1943.   C. A. GUSTAFSON   2,334,922
VEHICLE SEAT
Filed Feb. 4, 1941   3 Sheets-Sheet 3

INVENTOR
Carl A. Gustafson
BY Charles M. Finger
ATTORNEY

Patented Nov. 23, 1943

2,334,922

UNITED STATES PATENT OFFICE 2,334,922

VEHICLE SEAT

Carl A. Gustafson, Peoria, Ill., assignor to Caterpillar Tractor Co., San Leandro, Calif., a corporation of California Application February 4, 1941, Serial No. 377,327

4 Claims. (Cl. 155—9)

My invention relates to vehicle seats, and more particularly to improved yieldable mounting means for vehicle operator seats.

In certain types of vehicles, such as heavy duty trucks or tractors, travel of the vehicle causes considerable jarring or vibration of the vehicle frame, which is transmitted to the operator's seat supported thereon. This not only fatigues the operator but also renders manipulation of the vehicle by the operator, and any manipulatable auxiliary mechanism that might be propelled thereby, difficult, if not dangerous. This problem is particularly aggravating with respect to relatively high speed modern wheeled tractors in which the wheels are usually rubber tired and the tractor frame is non-resiliently or rigidly connected to the wheels, which results in considerable bouncing of the tractor frame. Such type of tractor is usually employed to pull or otherwise propel other mechanism, such as wheeled scrapers; and during travel thereof, jarring of the operator's seat is particularly bothersome should the operator desire to manipulate such other mechanism by controls accessible to the operator while he is seated.

My invention is designed to obviate the above described difficulties and has as its objects, among others, the provision of improved mounting means for a seat frame on a vehicle frame; which cushions the seat from jarring forces imparted to the vehicle frame; by which such seat frame is maintained substantially on an even keel with respect to the vehicle frame; and which is of relatively simple and economical construction. Other objects of my invention will become apparent from a perusal of the following description thereof.

In general, the seat mounting of my invention comprises a yieldable connection between the operator's seat frame and the vehicle frame to permit up and down movement of such seat frame with respect to the vehicle frame, thereby cushioning such seat frame from jarring forces imparted to the vehicle frame. In cooperation with such yieldable connection, means is provided to maintain said seat frame substantially on an even keel with respect to the vehicle frame; so that the operator may be positioned always in proper relationship with respect to controls mounted on the vehicle, even though such up and down movement of the seat frame occurs.

Reference is now made to the drawings for a more detailed description of the invention.

Figure 1:
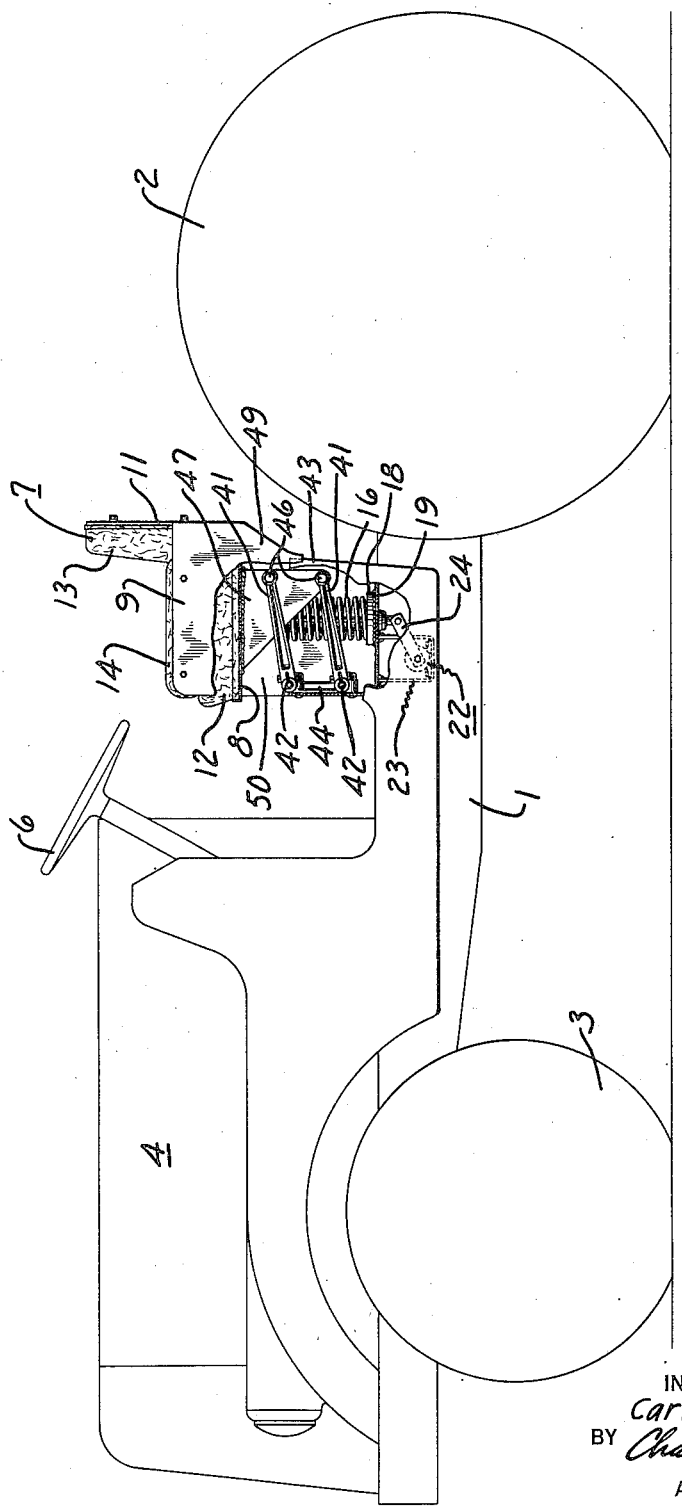
Fig. 1 is a side elevation of a form of vehicle in which the seat of my invention is employed, with a portion of such seat construction shown broken away to illustrate more clearly the structure.

The vehicle illustrated in the drawings is a rubber tired wheeled tractor adapted for relatively high speed operation, in which the tractor frame 1 has a non-resilient or unsprung connection with rear ground engaging driving wheels 2 and front ground engaging steerable wheels 3, and in which the seat construction of my invention has particular application for the reasons previously explained. However, it is to be understood that such seat construction may be employed in any other type of vehicle or environment where substantially the same problems are present. For providing power, any conventional power plant 4 is employed; and steering of front wheels 3 is effected through any suitable steering mechanism controllable by steering wheel 6.

Figure 2:
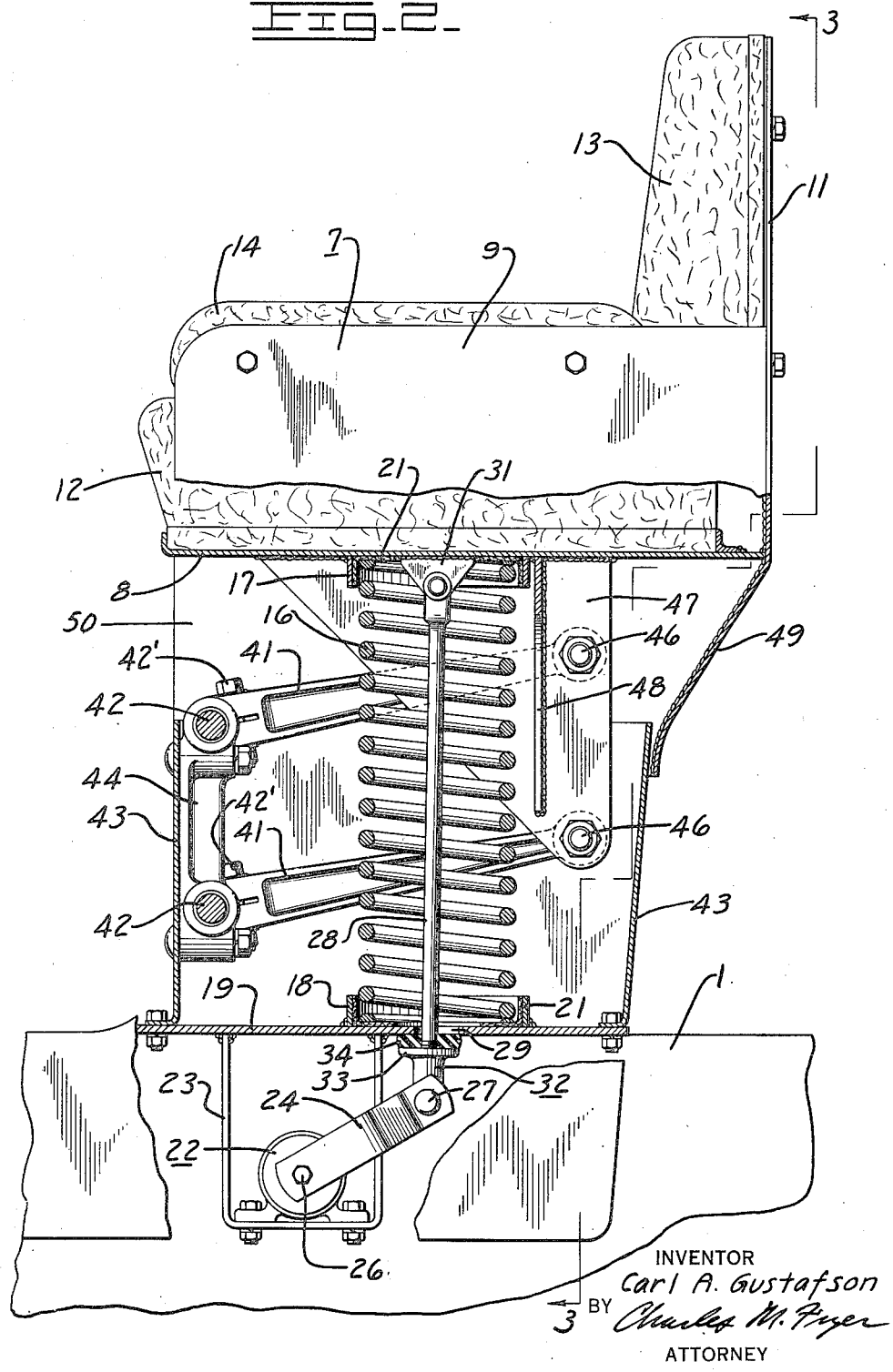
Fig. 2 is an enlarged side elevation of the seat construction, with parts broken away to show more clearly the structure.
Figure 3:
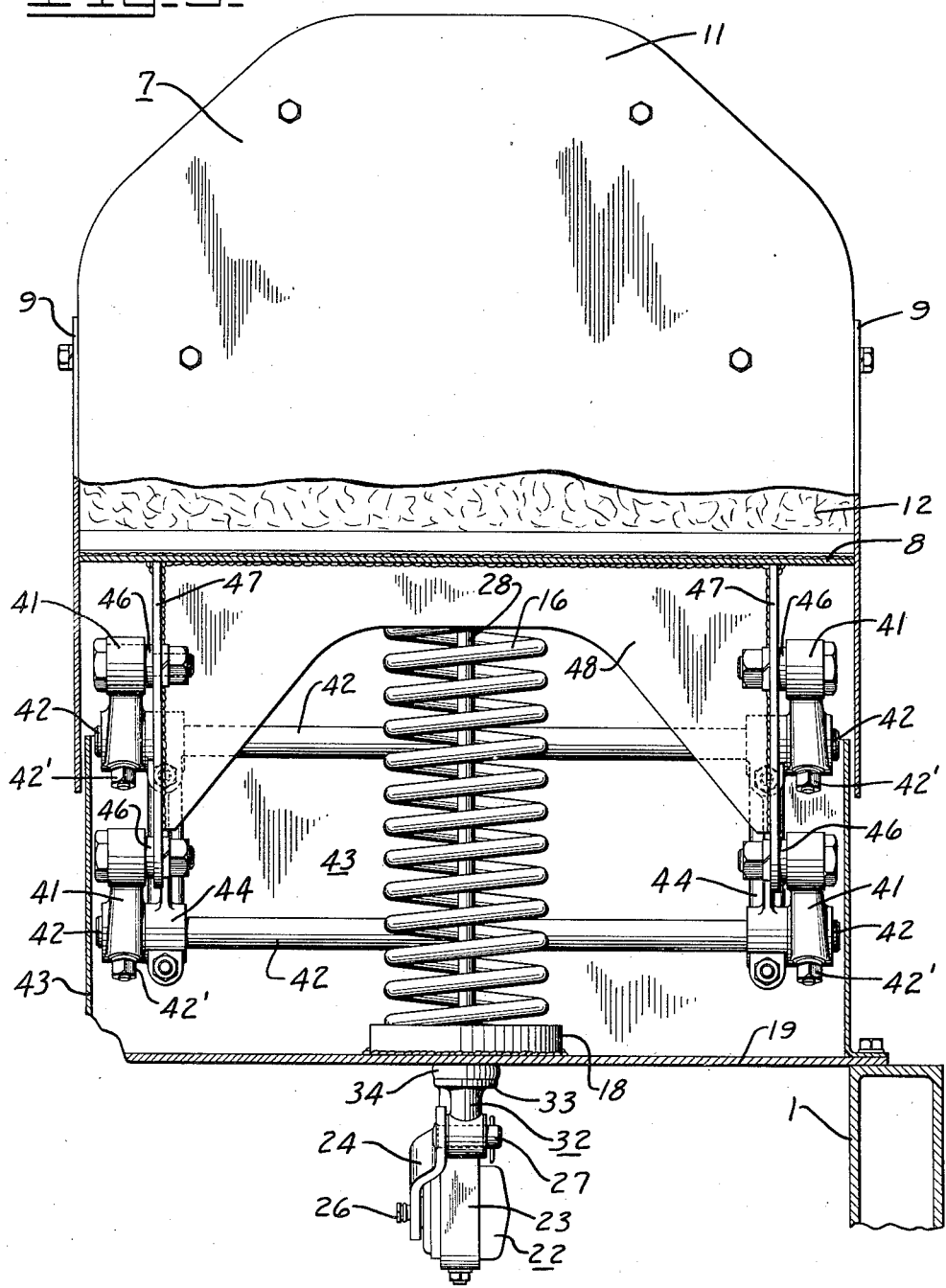
Fig. 3 is a transverse sectional elevation taken in planes indicated by line 3—3 in Fig. 2.

With particular reference to Figs. 2 and 3, seat frame 7 comprises the usual bottom member 8, side members 9 and back member 11 suitably secured together by any suitable means. A spring cushion 12 is supported on bottom member 8; while spring cushion 13 supported against back member 11 provides a back rest for the operator. Arm rests 14 are preferably secured to side members 9. To cushion the seat from jarring forces imparted to vehicle frame 1, yieldable or resilient means is provided between seat frame 7 and the vehicle frame, comprising compression spring 16, the upper end of which is supported in spring retainer 17 secured to the under side of bottom member 8, and the lower end of which is supported in similar spring retainer 18 secured to plate 19 forming part of vehicle frame 1. Suitable cups 21 of readily yieldable fibrous material, such as leather, are housed within retainers 17 and 18 to provide seats for the ends of spring 16 and thereby quiet their action.

Spring 16 provides means for cushioning downward movement of seat frame 7, resulting from jarring of vehicle frame 1. Cooperating with such spring 16 and forming part of the yieldable connection between seat frame 7 and vehicle frame 1, shock absorbing means is provided to snub the action of spring 16, thereby making for a relatively smooth floating mounting of the seat frame on the vehicle frame. Such shock absorbing means comprises any suitable shock absorber 22 mounted on U-shaped bracket 23 secured to the under side of plate 19. Forming part of such shock absorber 22 is a link 24 adapted to turn about pivot point 26. The free end of link 24 is pivotally connected at 27 to upright linkage including a rod 28 which passes through an enlarged aperture 29 in plate 19, and through the inside of spring 16. At its upper end, rod 28 is pivotally connected to seat frame 7 by means of bracket 31 secured to the under side of bottom member 8. A bearing 32 for the pivotal connection with link 24 and which is secured to the lower end of rod 28, is formed with a flange 33, between which and the under side of plate 19 is positioned a block 34 of resilient material, such as rubber, to provide a yieldable stop for limiting upward movement of the seat frame relative to the vehicle frame.

The yieldable or resilient mounting of the seat frame on the vehicle frame, which permits relative up and down movement therebetween, if employed alone would permit longitudinal, as well as sidewise tilting movements of the operator's seat with respect to the vehicle frame, and this is undesirable. To preclude such tilting movements, means is provided to maintain the operator's seat substantially on an even keel with respect to the vehicle frame, in the form of a substantially parallel linkage connection between the seat frame and the vehicle frame. Such parallel linkage connection comprises a plurality of spaced sets or pairs of substantially parallel links or arms 41; a pair of such arms 41 being located adjacent each side of seat frame 7. At one end, each of arms 41 is split and rigidly connected to a pivot shaft 42 by means of any suitable key, and a clamping bolt 42' for securing the split ends together. A pair of such pivot shafts 42 is provided, one for the upper arms 41 and the other for the lower arms 41. Such shafts are journalled through rectangularly shaped housing bracket 43 rigidly secured to plate 19 and to which are secured suitable bearings 44 for pivot shafts 42. Thus, arms 41 are pivotally connected to vehicle frame 1 at one end thereof. At their opposite end, arms 41 are pivotally connected at 46 to seat frame 7, through spaced gusset plates or brackets 47 rigidly secured to the under side of bottom member 8. For strengthening gusset plates 47, a transverse reenforcing plate 48 is rigidly secured therebetween.

The distance between each of pivots 42 and the associated pivot 46 is always the same, and the length of each of arms 41 remains the same. Hence, as seat frame 7 moves up and down relative to vehicle frame 1, it can not tilt forwardly or backwardly with respect to such vehicle frame, although it will have a slight longitudinal displacement which is immaterial. Also, because a plurality of sets of such parallel linkage is employed in spaced relationship, and the upper and the lower arms 41 are respectively secured to a common pivot shaft 42, seat frame 7 will not be able to tilt sidewise. Therefore, its movement will be confined to substantially true up and down movement with respect to the vehicle frame, and it will always be substantially on an even keel with respect to such frame. In this connection, securing of the upper arms and the lower arms 41, respectively, to a common pivot shaft 42 insures equal transmission of weight because weight applied to one side of the seat will be transmitted through shafts 42 to the opposite side. Bracket housing 43 serves to enclose the lower part of the seat supporting mechanism. Cooperating with bracket housing 43 is a U-shaped guard 49 secured to seat frame 7. The front of such guard is open at 50 to allow the slight longitudinal displacement of the seat frame as it moves up and down, but the sides and the rear of the guard telescope over housing 43.

I claim:

1. In a vehicle having a frame; an operator's seat frame; means mounting said seat frame for yielding up and down movement relative to said vehicle frame comprising spring means supporting said seat frame on said vehicle frame, and shock absorbing means connected between said seat frame and said vehicle frame; and means for maintaining said seat frame substantially on an even keel with respect to said vehicle frame during such up and down movement comprising laterally extending pivot shafts journaled for turning movement and connected to said vehicle frame, and laterally spaced sets of substantially parallel links, the corresponding links in such sets being rigidly secured at one end thereof to the same pivot shaft and being pivotally connected to said seat frame at the opposite end thereof.

2. In a vehicle having a frame including a plate member; an operator's seat frame mounted above said vehicle frame and including a plate member above said frame plate member; means mounting said seat frame for yielding up and down movement relative to said vehicle frame comprising compression spring means seated between said plate members; means cooperating with such yielding means to maintain said seat frame substantially on an even keel with respect to said vehicle frame during such up and down movement comprising seat bracket means extending downwardly from said seat plate member, frame bracket means extending upwardly from said frame plate member, and laterally spaced sets of substantially horizontally extending links pivotally connected between said bracket means, the links of each set being substantially parallel and being connected at one end thereof to the frame bracket means and at the opposite end thereof to the seat bracket means; and shock absorbing means connected between said frames including a shock absorber below said frame plate member, and a rod extending upwardly through an aperture in said frame plate member and connected to said shock absorber and to said seat plate member.

3. In a vehicle having a frame including a plate member; an operator's seat frame mounted above said vehicle frame and including a plate member above said frame plate member; means mounting said seat frame for yielding up and down movement relative to said vehicle frame comprising compression spring means seated between said plate members; means cooperating with such yielding means to maintain said seat frame substantially on an even keel with respect to said vehicle frame during such up and down movement comprising bracket means extending downwardly from said seat plate member, bracket means extending upwardly from said frame plate member, laterally extending parallel pivot shafts journalled for turning movement in one of said bracket means, and laterally spaced sets of substantially horizontally extending links, the links of each set being substantially parallel and rigidly secured at one end thereof to said pivot shafts with the corresponding links in such sets secured to the same pivot shaft and pivotally connected to the other of said bracket means at the opposite end thereof; and shock absorbing means connected between said frames including a shock absorber below said frame plate member, and a rod extending upwardly through an aperture in said frame plate member and connected to said shock absorber and to said seat plate member.

4. In a vehicle having a frame including a plate member; an operator's seat frame mounted above said vehicle frame and including a plate member above said frame plate member; means mounting said seat frame for yielding up and down movement relative to said vehicle frame comprising a compression spring seated between said plate members; means cooperating with such yielding means to maintain said seat frame substantially on an even keel with respect to said vehicle frame during such up and down movement comprising bracket means extending downwardly from said seat plate member, bracket means extending upwardly from said frame plate member, laterally extending parallel pivot shafts journalled for turning movement in one of said bracket means, and laterally spaced sets of substantially horizontally extending links, the links of each set being substantially parallel and rigidly secured at one end thereof to said pivot shafts with the corresponding links in such sets secured to the same pivot shaft and pivotally connected to the other of said bracket means at the opposite end thereof; shock absorbing means connected between said frames including a shock absorber below said frame plate member, and a rod extending upwardly through an aperture in said frame plate member and through said compression spring, said rod being connected to said shock absorber and to said seat plate member; and a stop for limiting upward movement of said seat frame comprising a flange movable with said rod below said frame plate member and a mass of resilient material between said flange and said frame plate member.

CARL A. GUSTAFSON.